INVENTOR.
ELLIOTT G. SCHRADER
BY
H. H. Losche
Attorney

INVENTOR.
ELLIOTT G. SCHRADER
BY
H. H. Losche
Attorney

INVENTOR.
ELLIOTT G. SCHRADER
BY
H. H. Losche
Attorney

United States Patent Office 3,394,372
Patented July 23, 1968

3,394,372

MEANS FOR TIME-LOCKING A RECEIVER INTERMEDIATE FREQUENCY BLANKING PULSE TO A TRANSMITTER PULSE

Elliott G. Schrader, Huntington Beach, Calif., assignor, by mesne assignments, to the United States of America as represented by the Secretary of the Navy Filed Sept. 26, 1967, Ser. No. 670,813
7 Claims. (Cl. 343—5)

ABSTRACT OF THE DISCLOSURE

A circuit means for producing receiver intermediate frequency (IF) blanking pulses and waveguide and receiver diode switching pulses by utilizing the timing pulses directly from the transmitter modulator (rather than from the synchronizer) to produce leading edge and trailing edge pulses through separators and pulse generators providing accurate time sequence of pulse events to enable the receiver to remain active a greater percentage of time for system sensitivity.

*Background of the invention*

This invention relates to radar receiver blanking circuits to protect the receiver during high power pulse transmission and more particularly to the utilization of the transmitter modulator pulses (in place of the synchronizer pulses to produce transmitter main bang pulses) for timing the blanking pulses for the radar receiver diode switches and waveguide diode switches to allow the receiver to be operational for a longer period of time between transmitted pulses. The utilization of the transmitter modulator pulses provide a failsafe receiver circuit by preventing a transmitter pulse from being transmitted unless the receiver is protected.

In a high repetition rate pulse Doppler radar, where conventional gas discharge tubes cannot be used, the usual means of protecting the receiver from the transmitter output pulse is (1) to protect the sensitive mixer by a diode switch and (2) to protect the IF amplifier by a desensitizing pulse. The pulses to those devices are usually derived from the synchronizer which supplies the transmitter pulses. Adjustable delay circuits are provided to assure proper pulse timing. Any adjustment or change in the width of the transmitter pulse usually requires a re-adjustment of the blanking generator pulse width, which presents a problem of proper blanking maintenance and tolerance.

*Summary of the invention*

In the present invention the modulator pulse, developed by the synchronous pulse, is applied to a double ended emitter follower and the output thereof applied in common to two leadnig edge separator circuits and trailing edge separator circuit. Each separator circuit is coupled respectively to a trigger generator to develop trigger pulses at the beginning of the modulator pulse, in the case of the leading edge separator channels, and at the trailing edge of the modulator pulse, in the case of the trailing edge separator channel. One leading edge channel utilizes the trigger generator output to trigger diode blanking circuits to produce blanking pulses to blank the receiver mixed diode switches and to produce pulses to enable the transmitter diode switch to conduct the modulator pulse to the transmitter. The other leading edge channel and the trailing edge channel have their outputs coupled to a blanking generator to produce blanking pulses for the IF diode switches of the receiver. To avoid unwanted oscillations in the radar receiver, it is necessary for the blanking or desensitizing pulse to the IF amplifier to be applied before the blanking pulse to the receiver diode switches as well as the enabling pulse to the transmitter or waveguide diode switch. Also, for the same reason, the IF amplifier must be turned "on" after the mixer diode switches have been switched to the receiver function. The actual transmitter pulse should occur after the diode switch is pulsed to the protect function and the end of the transmitter pulse should occur before the diode switch is switched to the receive function. The diode blanking circuits and the blanking generator circuit are designed to accomplish these functions in the proper time relation of the blanking pulses. Accordingly, it is a general object of this invention to provide receiver blanking pulses and transmitter enabling pulses developed from the transmitter modulator pulses to safeguard the receiver from the high power transmitted pulses and to enable the receiver for the maximum active time.

*Brief description of the drawings*

These and other objects and the attendant advantages, features, and uses will become more apparent to those skilled in the art as a more detailed description proceeds when considered along with the accompanying drawings in which.

*Description of the preferred embodiment*

Figure 1:
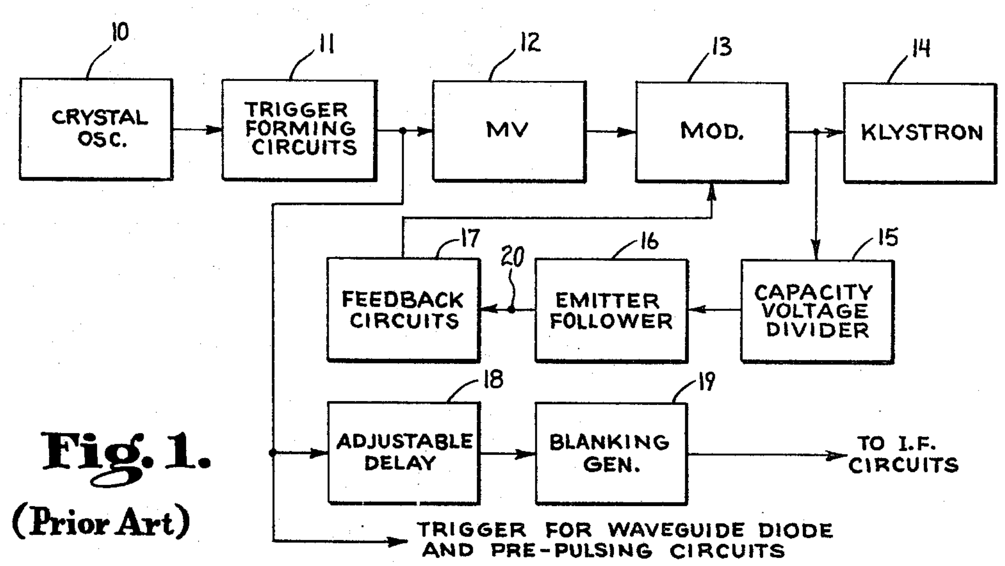
Fig. 1. (Prior Art)
FIGURE 1 is a block circuit diagram of a part of the radar system forming the environment of the invention and constituting the prior art.

Referring more particularly to FIGURE 1 a crystal oscillator 10 is shown in series with a trigger forming circuit 11, a multivibrator 12, and a modulator 13 to a klystron 14. The modulator 13 is usually provided with a feedback consisting of a capacitor voltage divider 15, an emitter follower 16, and a feedback circuit 17 to the modulator to maintain control thereof. Blanking pulses to blank the IF circuits of the radar and to blank the crystal mixers and to enable the waveguide diode circuits are usually taken from the synchronizer circuils, such as out of the trigger forming circuit 11 through an adjustable delay 18 and blanking generator 19 to the IF circuits and directly to the crystal mixer and waveguide diodes, as shown in FIGURE 1. As hereinbefore stated, the blanking generator becomes a problem to adjust the blanking IF pulses to provide maximum "on" time for the radar receiver and thus the adjustable delay 18 is used to correct for any changes in the trigger or synchronizing pulses.

Figure 2:
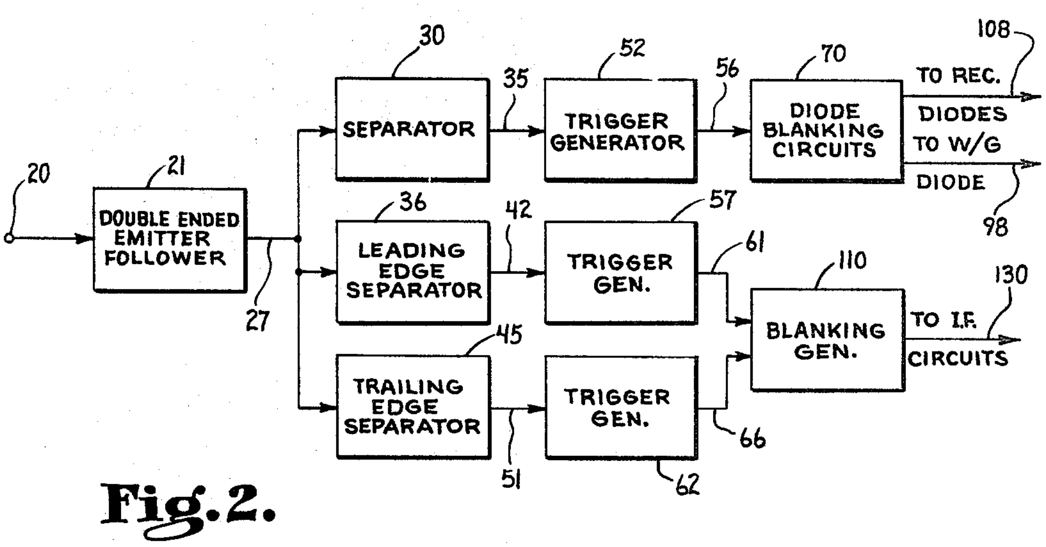
FIGURE 2 is a block circuit diagram of the invention used in conjunction with a part of the block circuit shown in FIGURE 1.

Referring more particularly to FIGURE 2, the circuit of this invention uses the transmitter pulse rather than the synchronizer pulse of the radar circuit which is herein shown as taking the transmitter pulse from terminal 20 out of the emitter follower in FIGURE 1 and eliminating the branch circuit from the trigger forming circuit through the adjustable delay circuit 18 and blanking circuit 19 to the IF circuits and other blanking circuits of the radar system. As seen in FIGURE 2 terminal 20 is coupled to a double ended emitter follower 21, the output 27 of which is coupled in common to a separator circuit 30, a leading edge separator circuit 36, and a trailing edge separator circuit 45. These separator circuits each have outputs 35, 42, and 51, respectively, to trigger generators 52, 57, and 62, respectively, forming first, second, and third channels. The output 56 of the trigger generator 52 is applied to diode blanking circuits 70 while the second and third channel outputs from trigger generators 57 and 62 on outputs 61 and 66, respectively, are applied to a blanking generator 110. The diode blanking circuits 70 produce blanking pulse outputs over the output 108 for the receiver mixer diodes and also produce an output 98 of pulses to enable the waveguide diode to pass the modulated pulses to the klystron, as shown in FIGURE 1. Blanking generator 110 provides an output 130 of blanking pulses to the IF circuits of the radar to disable the receiver during the period of the transmitted radar pulses.

Figure 3:
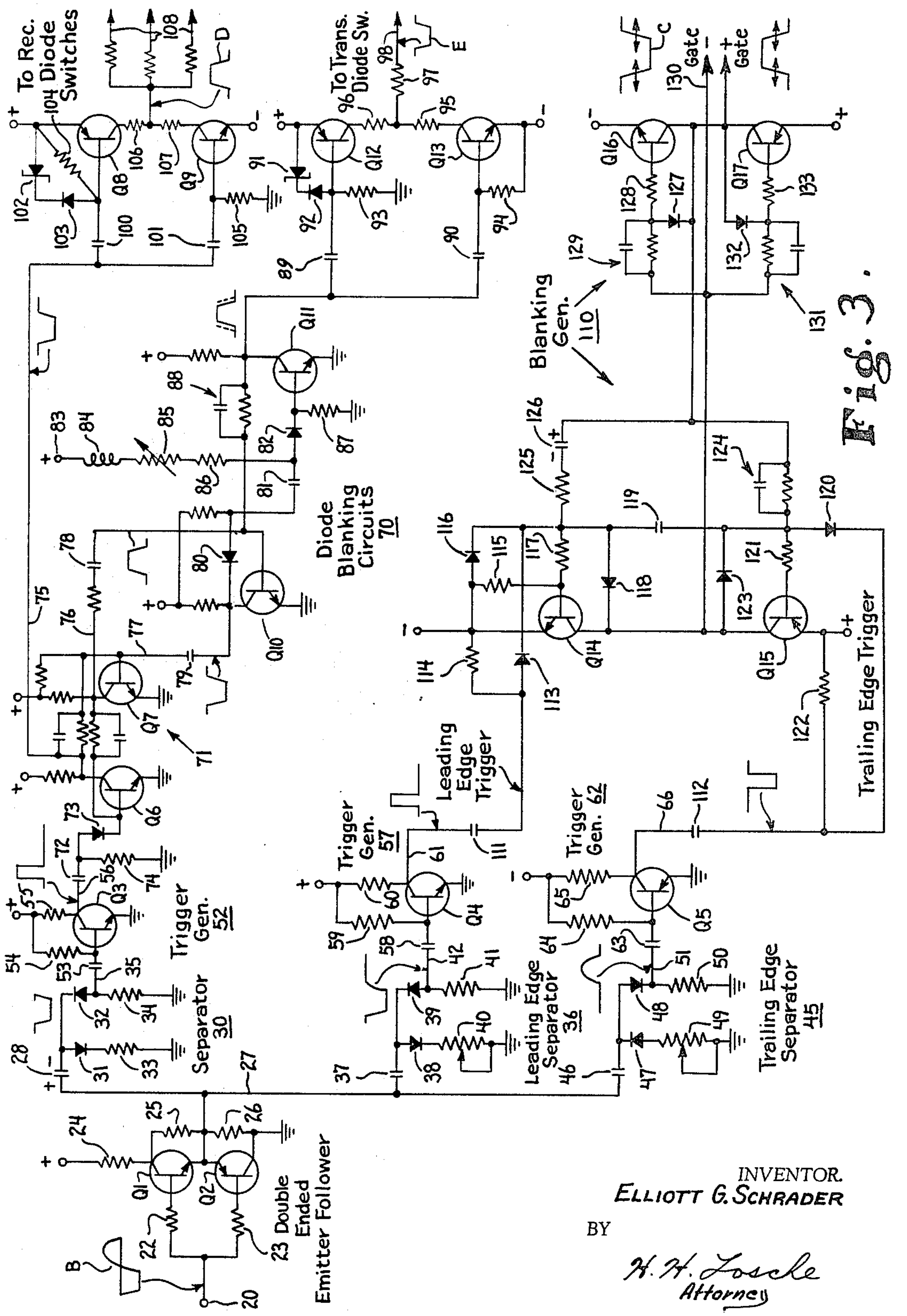
FIGURE 3 is a circuit schematic of the block circuit diagram of FIGURE 2.
Figure 4:
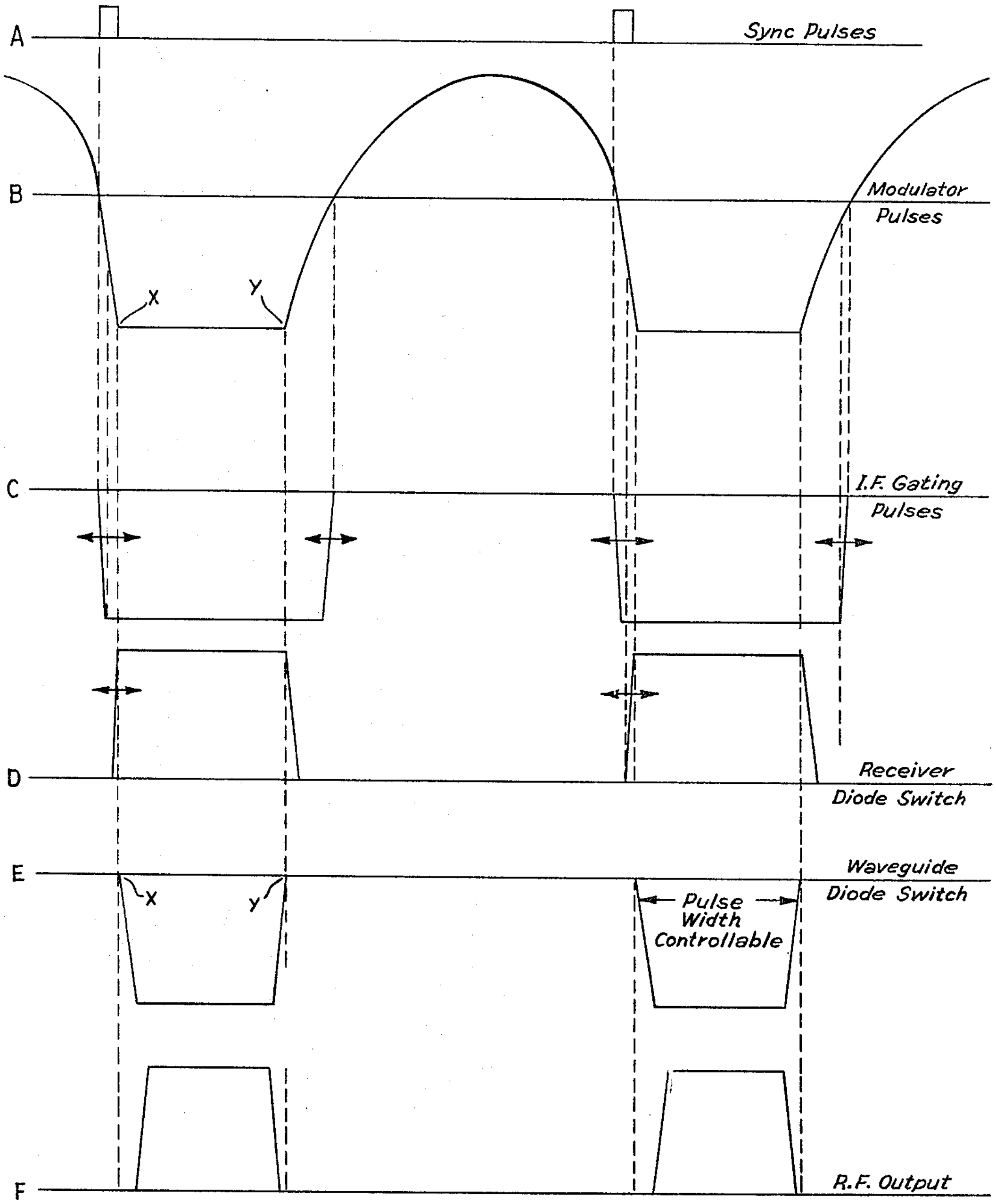
FIGURE 4 provides an illustration of the various waveforms appearing at various points in the circuit schematic diagram of FIGURE 3.

Referring more particularly to FIGURE 3 with occasional reference to FIGURE 4, the double ended emitter follower 21 consists of a pair of transistors Q1 and Q2 having their emitters coupled in common to the outputs 27. The terminal 20 is coupled in common as an input to transistors Q1 and Q2 through base resistors 22 and 23, respectively. The collector of transistor Q1 is coupled to a positive voltage source through a collector load resistor 24 while the collector of transistor Q2 is coupled directly to ground. The collector of transistor Q1 is coupled to the output 27 through a resistor 25 while the collector of transistor Q2 is coupled to the output 27 through a resistor 26. The modulator waveform applied to terminal 20 is as shown by waveform B above this terminal and also the waveform B in FIGURE 4 which is produced from the synchronous pulses A coming out of the multivibrator 12 shown in FIGURE 1.

In the first channel of separator 30 the output 27 of the emitter follower 21 is capacitor coupled by 28 to the anode of a diode 31 and the cathode of a diode 32 in common. The cathode of diode 31 and the anode of diode 32 are coupled through resistors 33 and 34, respectively, to ground. The output of separator circuit 30 is taken from the junction point of the diode 32 and resistor 34 on the output conductor 35.

A second channel including the leading edge separator 36 is capacitor coupled through 37 to the output 27 of the emitter follower 21 to the anode of a diode 38 and the cathode of a diode 39 in common. The cathode of the diode 38 is coupled through a variable resistor 40 to ground while the anode of the diode 39 is coupled through a fixed resistor 41 to ground. The output 42 is taken from the terminal of the anode of diode 39 and the resistor 41 which separates the leading edge of the waveform B, as shown over the output conductor 42.

The trailing edge separator 45 is coupled through the capacitor 46 to the output 27 from the emitter follower 21 to the cathode of a diode 47 and the anode of a diode 48 in common. The anode of diode 47 is coupled through a variable resistor 49 to ground while the cathode of the diode 48 is coupled through a fixed resistor 50 to ground, the output 51 from this separator being taken from the junction point of the diode 48 and resistor 50. While the variable resistors 40 and 49 are shown as single units, it is to be understood that it is possible to make the resistors 40 and 49 large fixed resistors in series with small adjustable trimmer resistors, where desired. If the latter is done the two resistors would tend to drive together with respect to temperature variations which would make the percentage of the waveform appearing across the other resistors 41 or 50 insensitive to the temperature variations. If the resistance of the variable resistance, such as 40 or 49, is equal to the resistance 41 or 50, respectively, the negative pulses of the waveform will appear across the resistor 50 in the case of the separator 45 and the positive portion will appear across resistor 41 in the case of separator 36 and the area under both separated waveforms will be equal. If the variable resistance is adjusted, the percentage of the diode waveform appearing across the other resistors 41 or 50 will change. For example, in the separator 36, if the resistance of 40 decreases the percentage of the applied waveform appearing across 41 will be conversely affected. It should be noted that the percentage of the output waveform appearing across 41 or 50 is independent of the variations in the amplitude of the waveform. Also, the percentage of the waveform appearing across 41 or 50 is a function of the ratio of 41 to 40 or 50 to 49 and not of the absolute values of these resistors. Because of this feature it is possible to make the variable resistors 40 and 49 trimmer resistors in series with large fixed resistors.

The output 35 of the separator 30 is capacitor coupled through 53 to the trigger generator 52. This trigger generator consists of a transistor Q3 base biased through a resistor 54 from a positive voltage source and collector loaded through a resistor 55 with the emitter grounded. A trigger pulse is generated from the leading edge of the modulator pulse B on the output 56, this waveform being shown above this output conductor.

In like manner the leading edge separator 36 output 42 is coupled through a capacitor 58 through a trigger generator 57 transistor Q4 which is biased through a resistor 59 and collector loaded through a resistor 60 with the emitter grounded and the output 61 producing a leading edge trigger pulse, as shown to the side of this output conductor. The trigger generator 62 is coupled by a capacitor 63 to the output 51 of the trailing edge separator 45 to the base of a transistor Q5 having its base biased from a negative voltage source through the resistor 64 and its collector loaded through a resistor 65 with the emitter grounded. The collector output is taken by way of conductor 66 to produce the trailing edge negative pulse, as shown at the side of this conductor. It is to be noted that the two leading edge trigger generators use NPN type transistors while the trailing edge trigger generator uses a PNP transistor.

The diode blanking circuits 70 are coupled to the output 56 of the trigger generator 50 through a coupling capacitor 72 and a diode 73 to the base of a transistor Q6 in a monostable multivibrator circuit including the circuits of transistors Q6 and Q7. The anode of the diode 73 is biased from ground potential through a resistor 74. One output of the monostable multivibrator 71 is on the collector output 75 producing a negative pulse, as shown at the side of this conductor, while a positive waveform is taken from the collector of transistor Q7 over the output 76. The output 77 of multivibrator 71 is similar to the output 75 producing a negative pulse on this output. The timing circuits of the monostable multivibrator circuit are such as to not exceed the flat portion X, Y, as seen in FIGURE 4 of the modulator pulses B. The output 76 is capacitor coupled through 78 to the base of transistor Q10 while the output 77 is capacitor coupled through 79 to the collector of transistor Q10. The collector of transistor Q10 is connected to the cathode of a diode 80, the anode of which is coupled to one plate of a capacitor 81, the opposite plate of which is coupled to the anode of the diode 82, the cathode of which is coupled to the transistor Q11. The terminal of capacitor 81 and diode 82 is coupled to a positive voltage source through an inductance 84, a width control variable resistance 85, and a fixed resistance 86. The base of transistor Q11 is biased from a fixed potential, such as ground, through a resistance 87. The base of transistor Q10 is coupled through a capacitor-resistance parallel circuit 88 to the collector of transistor Q11 to produce on this collector a positive pulse that is variable in width in accordance with the width control 85. Since the input to the collector of transistor Q10 from 77 and the input to the base of transistor Q10 from 76 are of opposite pulse polarity, transistor Q10 produces a very rapid production of the positive pulse on the output of transistor Q11 adjustable in width by control 85, as shown by the line of pulses E in FIGURE 4. The output from the transistor Q11 is applied through coupling capacitors 89 and 90 to the base electrodes of transistors Q12 and Q13. Transistor Q12 is a PNP type protected by the the Zener diode 91 and diode 92 coupled in series from the emitter to base, the base being biased through resistor 93 from ground potential. Q13 is an NPN type transistor having its emitter coupled directly to a negative voltage source and base biased through resistor 94 producing output signals through the resistors 95 and 97 in like manner as the collector output through the resistor 96 from transistor Q12 through the output resistor 97 to the output conductor 98. Transistor Q12 is normally conducting when the positive signal arrives cutting "off" transistor Q12 and turning "on" transistor Q13 to amplify the pulse E as shown on the output conductor 98. This pulse is to be applied to the diode switch in the transmitter waveguide section to enable or close this switch to permit the modulator pulse to activate the transmitter and thus produce the radar frequency (RF) output, as shown in line F of FIGURE 4.

The negative output pulse on conductor 75 is applied in common through coupling capacitor 100 and 101 to the base electrode of transistors Q8 and Q9, respectively. Transistor Q8 is protected against a high over voltage by the Zener diode 102 and diode 103 in series between the emitter and base. These diodes are also paralleled by a biasing resistor 104 holding transistor Q8 in a cut off state until the negative pulse arrives. Transistor Q9 is normally conducting since it is an NPN type transistor with its base bias from ground through a resistor 105. The outputs of transistors Q8 and Q9 are taken through resistors 106 and 107, respectively, to the output 108 which may be a parallel output, as shown, to be coupled to several receiver diode switches at the receiver mixers to blank these receiver mixers during the transmission pulse. When the negative pulse from conductor 75 is applied to the transistor Q8, Q9 will be cut off and Q8 will be placed in conduction to produce the positive blanking pulse D, as shown by this conductor and also in line D of FIGURE 4.

Blanking generator 110 has the leading edge trigger on output 61 coupled through a capacitor 111 and the trailing edge trigger on the output 66 coupled through the capacitor 112. The leading edge trigger is applied through the diode 113 oriented for conduction of positive pulses and having its anode biased from a negative voltage source through a resistor 114. The leading edge trigger is conducted to the base of transistor Q14 through the resistor 117, the base of this transistor being biased from the negative voltage source through the resistor 115, the opposite terminal of resistor 117 being blanked from the negative voltage source by diode 116. The right hand terminal of resistance 117 is coupled to the collector of transistor Q14 through a diode 118 oriented to prevent the collector voltage from ever exceeding the base voltage. The right hand terminal of resistor 117 and the anode of diode 118 are coupled to one plate of a capacitor 119, the opposite plate of which is coupled to the anode of a diode 120 and the right hand terminal of a resistance 121, the left hand terminal of which is directly coupled to the base of a transistor Q15. Transistor Q15 is of the PNP type having its emitter directly coupled to a positive voltage source which voltage source is also coupled through a resistance 122 to the cathode of the diode 120 carrying the trailing edge trigger from 66 through the capacitor 112. The junction of the anode of diode 120 and the resistor 121 is coupled through a resistance-capacitance parallel circuit 124 to the common collectors of transistors Q16 and Q17 in common with the right hand terminal 117 and the anode of diode 118 through a resistance 125 and a capacitance 126 in series. The common collectors of transistors Q16 and Q17 are also coupled to the cathode of a diode 127 and the resistor 128 to the base of transistor Q16 while the common collector output 130 of transistor Q14 and Q15 is coupled in common through a resistor capacitor parallel network 129 to the anode of diode 127 and also through a resistor capacitor parallel network 131 to the cathode of a diode 132 and the left hand terminal of a resistor 133 coupled to the base of transistor Q17. The common collector coupling of transistors Q14 and Q15 constitutes the negative gate output on the conductor 130 to produce the IF gating pulse C, as shown in FIGURE 4. A positive gate output is also shown from the common collector output of transistor Q16 and Q17 where it is desirable to have a positive gate output. Whenever the leading edge trigger is applied through the coupling capacitor 111, transistor Q14 will be rendered conductive directly coupling the negative voltage source to the emitter of transistor Q14 to the output conductor 130. This negative pulse will be applied through the network 131 to the base of transistor Q17 turning this transistor on to produce the positive gate output (where desired) and also feednig back this positive voltage through the capacitor 126 and resistor 125 to hold transistor Q14 in the conductive state. Upon the arrival of the negative trailing edge through capacitor 112, transistor Q15 will be turned "on" to connect the positive voltage connected to the emitter to the output conductor 130 producing the trailing edge of the blanking pulse C. At the same time this positive pulse will be applied through the network 129 and resistor 128 to render Q16 conductive and Q17 nonconductive to produce sharp cutoff of the waveform C. By adjusting the variable resistor 40 the leading edge of waveform C may be advanced or retarded and, in like manner, by adjusting variable resistor 49 the trailing edge of waveform C may be advanced or retarded. Since it is important that the IF circuitry of the receiver be disabled well in advance of the RF outputs of the radar and that this IF amplifier might be placed into operation well after the appearance of the RF output, the IF gating pulses C are of greater width than the RF output as well as the receiver diode switch blanking pulses D and the waveguide switch pulse E, as shown in FIGURE 4. By making pulse E of shorter duration than the receiver diode switch pulse D, the radar receiver will be protected since the RF output as shown by the pulses F cannot occur until the occurrence of the pulses E. The control of the leading and trailing edges of the IF gating pulses C make it possible to activate the radar receiver for the maximum time period between RF output pulses without endangering receiver overload from the RF output.

*Operation*

While the operation would appear to be clear from the prior detailed description of the figures, the principal advantages of the invention may be better understood by a brief description of operation. If a radar circuit of FIGURE 2 is placed into operation in conjunction with the environment as shown in FIGURE 1, the double ended emitter follower 21 will apply the modulator pulse B to the two leading edge separator circuits and the trailing edge separator circuit. The double emitter follower is used to prevent load of the transmitter circuit and to provide a low impedance driving source for the blanking generator circuits. The first channel separator circuit 30 activates the monostable multivibrator which is preset to produce the proper width positive and negative pulse outputs which may be changed by changing the timing networks of the multivibrator circuit 71. The timing network however is preset to produce a plateau width of the output pulses to be no greater than the plateau width X, Y of the modulator pulse. This insures that the blanking pulses D to the resistor diode mixer switches never exceed the modulator pulse width X, Y. The waveguide enabling pulse E on the output 98 is adjustable in width not to exceed the width X, Y of the modulator pulse but may be adjusted by the width control 85 to narrow the pulse width E thereby narrowing the RF output width wherever and whenever desired.

The controls 40 and 49 are adjustable to adjust the IF gating pulses C within the limits shown in FIGURE 4 from the top of the leading edge of the negative modulator pulse to its point X on the leading edge of pulse C and from the point Y to the point at which the modulator pulse crosses the line, being the limits of varying the trailing edge of the IF gating pulse C. Thus the radar receiver is operating failsafe since the IF gating pulses can never be so narrow as to endanger overloading the receiver from the RF output and the crystal mixers are protected since their blanking pulses D will always be equal to or exceed the pulse width of the waveguide enabling pulses E. Thus by timing the blanking pulses of a radar receiver directly from the radio transmitter, rather than from the main system synchronizer, a closer control of the timing is possible thereby permitting the radar receiver to remain active a greater part of the time for increased radar sensitivity.

While many modifications and changes may be made in the constructional details and features of this invention to accomplish similar results within the spirit of this invention, I desire to be limited in the scope of my invention only by the scope of the appended claims.

I claim:

1. A means for time-locking a radar receiver intermediate frequency blanking pulse to a transmitter pulse of a radar system having a modulator to develop pulse signals for the transmitter comprising:
an emitter follower coupled to the output of said modulator and having an output;
two leading edge separator circuits and one trailing edge separator circuit coupled in common to the output of said emitter follower, each separator circuit having an output;
a trigger generator coupled to each separator circuit and having an output, the two leading edge separator circuits and the trailing edge separator circuit coupled to the respective trigger generators constituting first and second leading edge channels and a trailing edge channel, respectively;
a diode blanking circuit coupled to the output of said first leading edge channel, said diode blanking circuit producing a first output of diode blanking pulses and a second output of diode blanking pulses, each second diode blanking pulse having a time duration within the time duration of a corresponding first diode blanking pulse; and
a blanking generator coupled in common to the outputs of said second and third leading and trailing edge channels, said blanking generator generating a blanking pulse on an output thereof for each pair of leading edge and trailing edge trigger pulses and coextensive therewith whereby blanking pulses are produced which are adapted for application of the first diode blanking pulses to the radar receiver mixer diode switches to protect the receiver mixers, of the second diode blanking pulses to the radar transmitter diode waveguide switch to switch each modulator pulse to the transmitter, and of the blanking pulses to the receiver intermediate frequency diode switch to protect the receiver and to disable the receiver when the transmitter is transmitting a pulse.

2. A means for time-locking a radar receiver intermediate frequency blanking pulse to a transmitter pulse of a radar system as set forth in claim 1 wherein
said emitter follower is a double ended emitter follower.

3. A means for time-locking a radar receiver intermediate frequency blanking pulse to a transmitter pulse of a radar system as set forth in claim 2 wherein
each separator circuit includes a pair of reversely oriented diodes in parallel, each diode having a resistance in series therewith to a fixed potential, the input being in common to said pair of diodes and said output being taken from the junction between one diode of said pair and its resistance in series, said leading edge separator circuits having said output taken from the anode of said one diode and said trailing edge separator circuit having said output taken from the cathode of said one diode, and the resistance in series with the other diode of said pair of diodes of said other leading edge separator circuit and said trailing edge separator circuit being variable resistances.

4. A means for time-locking a radar receiver intermediate frequency blanking pulse to a transmitter pulse of a radar system set forth in claim 3 wherein
said blanking generator includes two pair of semiconductor switch circuits, one pair coupled to receive a leading edge trigger pulse from said second channel output and a trailing edge trigger pulse from said third channel output, the output of said one pair of semiconductors being coupled to the second pair of semiconductors to control conduction between leading edge and trailing edge pulses, pulse width being adjustable within limits of the modulator pulse in accordance with the adjustment of said variable resistances in said separator circuits.

5. A means for time-locking a radar receiver intermediate frequency blanking pulse to a transmitter pulse of a radar system set forth in claim 4 wherein
said diode blanking circuit includes a monostable multivibrator coupled to said trigger generator output of said first channel, said monostable multivibrator having a time function to produce positive and negative pulses simultaneously no greater than the time duration of a modulator pulse signal, the negative pulse being applied through a first driver circuit to produce said receiver diode switch pulse and the positive and negative pulses being applied through a second driver circuit to produce said waveguide diode switch pulse, said second driver circuit having adjustable means to adjust the width of said waveguide diode switch pulse to a maximum width of said receiver diode switch pulse.

6. A means for time-locking a radar receiver intermediate frequency blanking pulse to a transmitter pulse of a radar system as set forth in claim 5 wherein
said double ended emitter follower consists of an NPN transistor and a PNP transistor in a common emitter coupling and with the collectors thereof coupled in a voltage circuit through a collector load resistor, the input being in common and coupled respectively through a resistance to the base electrode of each transistor, and the collectors being coupled each through a resistance to a common output.

7. A means for time-locking a radar receiver intermediate frequency blanking pulse to a transmitter pulse of a radar system as set forth in claim 6 wherein
each said channel of a separator and a trigger generator has its input coupled through a coupling capacitor, has the separator and trigger generator coupled through a coupling capacitor, and has its output coupled through a coupling capacitor.

References Cited

UNITED STATES PATENTS

| | | | |
|---|---|---|---|
| 2,939,139 | 5/1960 | Handler | 343—180 |
| 3,124,761 | 3/1964 | Fackler et al. | 330—51 |
| 3,305,859 | 2/1967 | Schwartz | 343—5 |

RODNEY D. BENNETT, *Primary Examiner.*

C. L. WHITHAM, *Assistant Examiner.*